(12) United States Patent
Liu (10) Patent No.: US 10,061,154 B2
(45) Date of Patent: Aug. 28, 2018

(54) METHOD FOR MANUFACTURING QUANTUM DOTS DISPLAY PANEL

(71) Applicant: Shenzhen China Star Optoelectronics Technology Co., Ltd., Shenzhen (CN)

(72) Inventor: Guohe Liu, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 371 days.

(21) Appl. No.: 14/912,607

(22) PCT Filed: Dec. 23, 2015

(86) PCT No.: PCT/CN2015/098511
§ 371 (c)(1),
(2) Date: Feb. 18, 2016

(87) PCT Pub. No.: WO2017/084151
PCT Pub. Date: May 26, 2017

(65) Prior Publication Data
US 2018/0031909 A1    Feb. 1, 2018

(30) Foreign Application Priority Data

Nov. 16, 2015   (CN) .......................... 2015 1 0785942

(51) Int. Cl.
*G02F 1/1335* (2006.01)
*G02F 1/1368* (2006.01)
(Continued)

(52) U.S. Cl.
CPC ....... *G02F 1/133516* (2013.01); *B05D 1/005* (2013.01); *G02F 1/1339* (2013.01); *G02F 1/1368* (2013.01); *G02F 1/133512* (2013.01); *G02F 1/133514* (2013.01); *G02F 1/133528* (2013.01); *G02F 1/133617* (2013.01);
(Continued)

(58) Field of Classification Search
CPC ......... G02F 1/133516; G02F 1/133617; G02F 1/1368; G02F 1/133514; G02F 1/133512; G02F 1/133528; G02F 1/1339; G02F 2001/133614; G02F 2202/36;
(Continued)

(56) References Cited

U.S. PATENT DOCUMENTS

2015/0048348 A1*  2/2015  Huang .................. H01L 27/322
257/40

* cited by examiner

*Primary Examiner* — Kevin Quaterman
(74) *Attorney, Agent, or Firm* — Leong C. Lei (57) ABSTRACT

A method for manufacturing quantum dots display panel comprises the following steps of: using an existing yellow light manufacturing process from color filter or combining with a dry etching manufacturing process to resin composition with surface-modified red quantum dots and surface-modified green quantum dots, then completing production of a quantum dots layer with a more refined graphical structure. Compared with other existing method for manufacturing quantum dots display panel, the present disclosure has the following advantages that simple preparation of raw materials and in making process, high-resolution graphics, large-scale volume production, and less processing time and cost are saved. The quantum dots are used into the structure of the color filter is to effectively improve color saturation and gamut of the display device, and to enhance color performance of display panel.

17 Claims, 4 Drawing Sheets (51) Int. Cl.
*G02F 1/1339* (2006.01)
*B05D 1/00* (2006.01)
(52) U.S. Cl.
CPC ............... *G02F 1/133621* (2013.01); *G02F 2001/133531* (2013.01); *G02F 2001/133614* (2013.01); *G02F 2202/10* (2013.01); *G02F 2202/36* (2013.01)
(58) Field of Classification Search
CPC ..... G02F 2202/10; G02F 2001/133531; G02F 1/133621; B05D 1/005
See application file for complete search history.

METHOD FOR MANUFACTURING QUANTUM DOTS DISPLAY PANEL

FIELD OF THE DISCLOSURE

The present disclosure relates to a display technology field, and more particularly to a method for manufacturing quantum dots display panel.

BACKGROUND OF THE DISCLOSURE

With the continuous development of display technology, and people require the quality of display increasing, the quantum dots (QDs), also known, is a kind of spherical or spherical semiconductor nanocrystals composed by group II-VI or group III-V, usually between several nanometers to several tens of nanometers due QDs particle size of less than or close to the exciton Bohr radius corresponding material, resulting in a quantum confinement effect its energy level structure from a quasi-continuous material into discrete quantum dots material structure, resulting QDs exhibit special stimulated luminescent properties. As the size of the QDs is reduced, increasing the band gap energy level, the corresponding excited QDs and quantum energy required points excited to the ground state energy released is increased correspondingly, the performance of the excitation of QDs and fluorescence spectra of a "blue shift" phenomenon, by controlling the QDs size to the emission spectrum and can cover the entire visible region. Such as the size of the Cadmium selenide (CdSe) reduced from 6.6 nm to 2.0 nm, its emission wavelength from red region 635 nm "blue shift" to the blue region of 460 nm.

Quantum dots material has the advantages of concentrated emission spectrum, high color purity and the luminous color is easy to adjust, etc., will be applied to display device and can effectively improve gamut and color reproduction.

Patent CN103226260A and patent US20150002788A1 are proposed a technical scheme for color display by a quantum dots layer structure with pattern instead of color filter, but the method for quantum dots layer graphical doesn't described.

Patent CN103226260A provides a method for dispersing quantum dots in photoresist by lithography process patterned quantum dots layer, however the photoresist has initiation, monomer, polymer, additive and other polymer materials, and surface of the quantum dots is chemical environment of complex conditions, have a great influence on lighting efficiency of quantum dots. In addition to the above-described method, produced quantum dots pattern also can by transfer or screen printing, however resolution of quantum dots pattern by transfer is low, the edge is jagged, and adhesion between quantum dots layer and substrate remains to be improved; the ink-jet printing method for quantum dots layer pattern is demanding the equipment, how to ensure stability of Ink-jet ink droplet and printing accuracy still has technical barriers and they can't be mass-produced.

SUMMARY OF THE DISCLOSURE

The present disclosure provide a method for manufacturing a quantum dots display panel, preparation of raw materials and simple in making process, high-resolution graphics, large-scale volume production, and processing time and cost are saved.

To achieve the above object, the present disclosure provides a method for manufacturing a quantum dots display panel includes the following steps:

Step 1, obtaining a quantum dots resin composition by mixing surface-modified red quantum dots, surface-modified green quantum dots, alkali-soluble resin, solvent, and dispersant uniformly;

Step 2, providing a color film substrate, and the color film substrate including a substrate, a black array located on the substrate and a color filter layer, the color filter layer including a red colored barrier layer, a green colored barrier layer and a transparent light resistance layer;

Coating the quantum dots resin composition uniformly on color filter layer side of the color substrate by spin coating method or slit coating method, then pre-baking the substrate having the quantum dots resin composition at a temperature of 100-150 DEG C. to remove organic solvent and obtaining a quantum dots film;

Step 3, using a yellow light manufacturing process or combining with a dry etching manufacturing process to perform patterning processing on the quantum dots film, and removing part of the quantum dots film corresponding to the transparent light resistance layer to obtain a quantum dots layer, and then completing production of a quantum dots color film substrate;

Step 4, providing a TFT substrate, and respectively arranging an upper polarizer and a lower polarizer on the quantum dots color film substrate and the TFT substrate, and after a process cartridge into the liquid crystal display, obtaining a quantum dots display panel after a forming process of a liquid crystal box;

The quantum dots display panel includes the quantum dots color film substrate, the TFT substrate disposed opposite to the quantum dots color film substrate, the liquid crystal layer sealed between the quantum dots color film substrate and the TFT substrate, the upper polarizer arranging on one side of the quantum dots color film substrate, the lower polarizer arranging on one side of the TFT substrate.

The step 3 of using the yellow light manufacturing process to perform patterning processing on the quantum dots film, the step 3 specifically including the steps of:

Step 31, using a spin coating method or a slit coating method to coat a layer of transparent photoresist material uniformly on the quantum dots film after pre-baking;

Step 32, providing a light mask, and using the light mask to perform development process and exposure process of the transparent photoresist material, wherein the light mask includes a transmitting portion corresponding to the red colored barrier layer and the green colored barrier layer, a non-transmitting portion corresponding to the transparent light resistance layer; wherein in the exposure process, the transparent photoresist material below the transmitting portions takes polymerization reaction to solidify under illumination, the transparent photoresist material below the non-transmitting portions does not take polymerization reaction to solidify, and in the development process, the solidified transparent photoresist material and the corresponding quantum dots film below the solidified transparent photoresist material is not removed by developer, but the unsolidified transparent photoresist material and the corresponding quantum dots film below the unsolidified transparent photoresist material are removed by developer; and obtaining a patterned quantum dots layer and a photoresist layer upon the pattern layer;

Step 33, baking the color film substrate at a temperature of 150-250 DEG C. to fully cure the quantum dots layer.

The step 3 of combining the yellow light manufacturing with the dry etching manufacturing process to perform patterning processing on the quantum dots film, the step 3 specifically including the steps of:

Step 31', after pre-baking in step 2, baking the color film substrate at a temperature of 200-250 DEG C. to fully cure the quantum dots film;

Step 32', using a spin coating method or a slit coating method to coat a layer of transparent photoresist material uniformly on the quantum dots film after pre-baking; providing a light mask, and using the light mask to perform development process and exposure process of the transparent photoresist material to obtain a patterned photoresist layer, wherein the light mask includes a transmitting portion corresponding to the red colored barrier layer and the green colored barrier layer, a non-transmitting portion corresponding to the transparent light resistance layer;

Step 33', using the photoresist layer as a screening layer, the color film substrate is processed by using a dry etching process, in process of the dry etching process, portion of the quantum dots film on the red colored barrier layer and the green colored barrier layer is covered by the photoresist layer but is not etched by the dry etching process, but portion of the quantum dots film on the transparent light resistance layer is not covered by the photoresist layer but etched by the dry etching process to obtain a patterned quantum dots layer.

In the step 1, the red quantum dots and the green quantum dots of the quantum dots resin composition are group II-VI semiconductor material, group III-V semiconductor material and one or more of group IV-VI nanometer semi-conductor material in one or more, and size of the red quantum dots size and the green quantum dots is 1-10 nm.

The step 1 the alkali-soluble resin is composed of styrene and maleic anhydride copolymer or styrene and aromatic acid (meth) acrylate half ester.

In the step 1 the solvent is composed of formic acid, acetic acid, chloroform, acetone, methyl ethyl ketone, alcohols, ethylene glycol monomethyl ether, ethylene glycol monoethyl ether, ethylene glycol monomethyl ether, ethylene glycol monomethyl ether, diethylene glycol diethyl ether ethyl acetate, methyl ethyl ketone, methyl isobutyl ketone, ethylene glycol monomethyl ether acetate, γ-butyrolactone, prop-3-acid ether acetate, butyl carbitol, butyl carbitol, acetate, propylene glycol monomethyl ether, propylene glycol monomethyl ether acetate, cyclohexane, xylene and isopropanol in one or more components.

In the step 2, thickness of the quantum dots resin composition coated on the color film substrate is 1 μm-200 μm.

In the quantum dots display panel of the step 4, the upper polarizer is internal and is arranged one side of the quantum dots color film substrate toward the TFT substrate; the upper polarizer is dye type polaroid.

The quantum dots display panel of the step 4, the lower polarizer is internal or external, the lower polarizer is arranged one side of TFT substrate toward or backward the quantum dots color substrate; polarization direction of the lower polarizer is perpendicular to polarization direction of the upper polarizer.

The quantum dots display panel of the step 4 is used in a blue backlight display device.

The present disclosure provides a method for manufacturing quantum dots display panel includes the following steps:

Step 1, obtaining a quantum dots resin composition by mixing surface-modified red quantum dots, surface-modified green quantum dots, alkali-soluble resin, solvent, and dispersant uniformly;

Step 2, providing a color film substrate, and the color film substrate including a substrate, a black array located on the substrate and a color filter layer, the color filter layer including a red colored barrier layer, a green colored barrier layer and a transparent light resistance layer;

Step 3, using a yellow light manufacturing process or combining with a dry etching manufacturing process to perform patterning processing on the quantum dots film, and removing part of the quantum dots film corresponding to the transparent light resistance layer to obtain a quantum dots layer, and then completing production of a quantum dots color film substrate;

Step 4, providing a TFT substrate, and respectively arranging an upper polarizer and a lower polarizer on the quantum dots color film substrate and the TFT substrate, and after a process cartridge into the liquid crystal display, obtaining a quantum dots display panel after a forming process of a liquid crystal box;

The quantum dots display panel includes the quantum dots color film substrate, the TFT substrate disposed opposite to the quantum dots color film substrate, the liquid crystal layer sealed between the quantum dots color film substrate and the TFT substrate, the upper polarizer arranging on one side of the quantum dots color film substrate, the lower polarizer arranging on one side of the TFT substrate;

In the step 1, the red quantum dots and the green quantum dots of the quantum dots resin composition are group II-VI semiconductor material, group III-V semiconductor material and one or more of group IV-VI nanometer semi-conductor material in one or more, and size of the red quantum dots size and the green quantum dots is 1-10 nm.

The step 1 the alkali-soluble resin is composed of styrene and maleic anhydride copolymer or styrene and aromatic acid (meth) acrylate half ester;

In the step 1 the solvent is composed of formic acid, acetic acid, chloroform, acetone, methyl ethyl ketone, alcohols, ethylene glycol monomethyl ether, ethylene glycol monoethyl ether, ethylene glycol monomethyl ether, ethylene glycol monomethyl ether, diethylene glycol diethyl ether ethyl acetate, methyl ethyl ketone, methyl isobutyl ketone, ethylene glycol monomethyl ether acetate, γ-butyrolactone, prop-3-acid ether acetate, butyl carbitol, butyl carbitol, acetate, propylene glycol monomethyl ether, propylene glycol monomethyl ether acetate, cyclohexane, xylene and isopropanol in one or more components.

The present disclosure has the following advantages: the present disclosure provide a method for manufacturing quantum dots display panel, using an existing yellow light manufacturing process from color filter or combining with a dry etching manufacturing process to resin composition with surface-modified red quantum dots and surface-modified green quantum dots, then completing production of a quantum dots layer with a more refined graphical structure. Compared with other existing method for manufacturing quantum dots display panel, the present disclosure has the following advantages that preparation of raw materials and simple in making process, high-resolution graphics, large-scale volume production, and processing time and cost are saved, and introducing quantum dots into structure of color filter is effectively improve color saturation and gamut of display device, enhance color performance of display panel.

BRIEF DESCRIPTION OF THE DRAWINGS

Below in conjunction with the accompanying drawings, the present disclosure will be described in detail by specific embodiments, the present disclosure will enable technology and other beneficial effect is obvious.

In the drawings.

DETAILED DESCRIPTION OF PREFERRED EMBODIMENTS

To further illustrate the present disclosure taken in techniques and their effects, the following in connection with preferred embodiments of the present disclosure and the accompanying drawings in detail.

Figure 1:
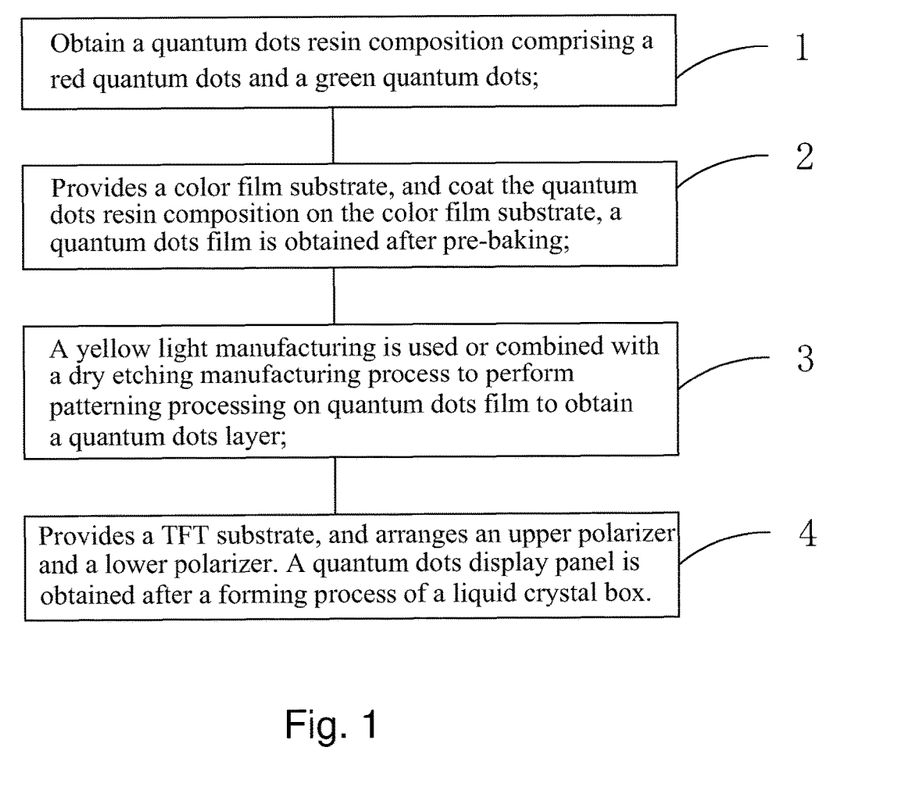
FIG. 1 is a schematic flow quantum dots display panel manufacturing method according to the present disclosure.

Refer to FIG. 1, The present disclosure provides a method for manufacturing a quantum dots display panel includes the following steps:

Step 1, obtain a quantum dots resin composition by mixing surface-modified red quantum dots, surface-modified green quantum dots, alkali-soluble resin, solvent, and dispersant uniformly;

Specifically, the red quantum dots and the green quantum dots of the quantum dots resin composition are group II-VI semiconductor material (such as CdS, CdSe, HgTe, ZnS, ZnSe, ZnTe, HgS), group III-V semiconductor material (such as InP, InAs, GaP, GaAs) and one or more of group IV-VI nanometer semi-conductor material in one or more, and size of the red quantum dots size and the green quantum dots is 1-10 nm.

Specifically, the alkali-soluble resin is composed of styrene and maleic anhydride copolymer or styrene and aromatic acid (meth) acrylate half ester.

Specifically, the solvent is composed of formic acid, acetic acid, chloroform, acetone, methyl ethyl ketone, alcohols, ethylene glycol monomethyl ether, ethylene glycol monoethyl ether, ethylene glycol monomethyl ether, ethylene glycol monomethyl ether, diethylene glycol diethyl ether ethyl acetate, methyl ethyl ketone, methyl isobutyl ketone, ethylene glycol monomethyl ether acetate, γ-butyrolactone, prop-3-acid ether acetate, butyl carbitol, butyl carbitol, acetate, propylene glycol monomethyl ether, propylene glycol monomethyl ether acetate, cyclohexane, xylene and isopropanol in one or more components.

Figure 2:
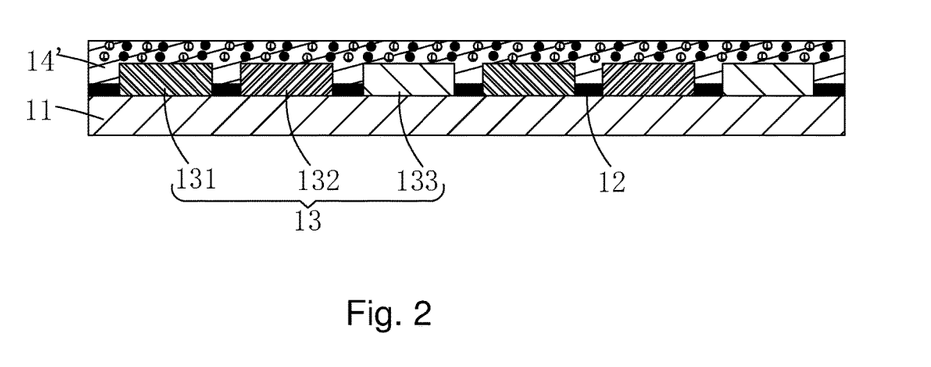
FIG. 2 is a schematic diagram of the step 2 of the quantum dots display panel manufacturing method according to the present disclosure.

Step 2, shown in FIG. 2, provides a color film substrate, and the color film substrate includes a substrate 11, a black array 12 located on the substrate 11 and a color filter layer 13. The color filter layer 13 includes a red colored barrier layer 131, a green colored barrier layer 132 and a transparent light resistance layer 133. The red colored barrier layer 131 includes a plurality of red sub-pixel unit, the green colored barrier layer 132 includes a plurality of green sub-pixel unit and the transparent light resistance layer 133 includes a plurality of transparent sub-pixel unit;

Coat the quantum dots resin composition uniformly on color filter layer 13 side of the color substrate by spin coating method or slit coating method, and then pre-bake the substrate having the quantum dots resin composition at a temperature of 100-150 DEG C. to remove organic solvent. A quantum dots film 14' is obtained. Specifically, in the step 2, thickness of the quantum dots resin composition coated on the color film substrate is 1 μm-200 μm.

Figure 5:
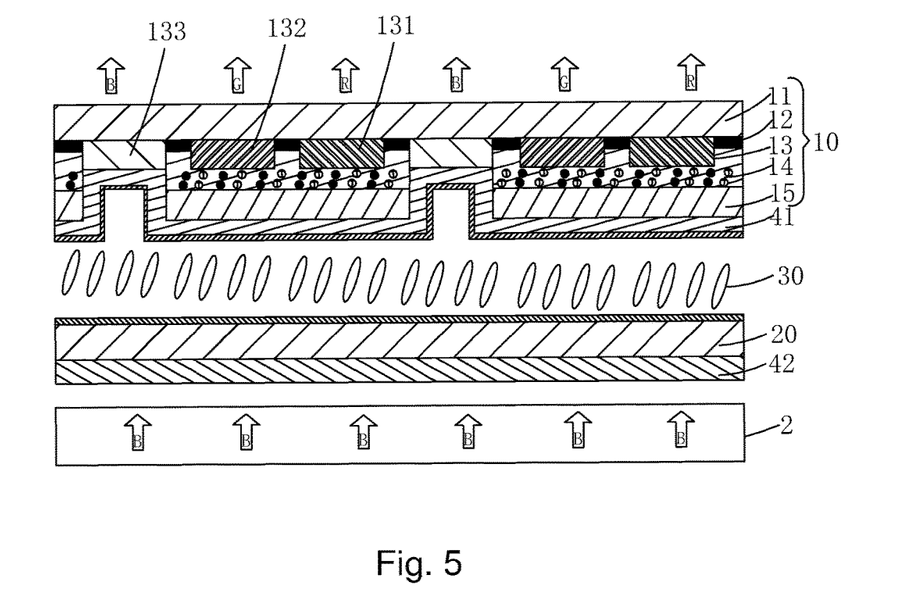
FIG. 5 is a schematic diagram of the quantum dots display panel applied to color display in display device by quantum dots display panel manufacturing method according to the present disclosure.

Step 3, a yellow light manufacturing process is used or combined with a dry etching manufacturing process to perform patterning processing on the quantum dots film 14'. part of the quantum dots film 14' corresponding to the transparent light resistance layer 133 is removed to obtain a quantum dots layer 14, and then the production of a quantum dots color film substrate 10 is completed Step 4, provides a TFT substrate 20, and respectively arranges an upper polarizer 41 and a lower polarizer 42 on the quantum dots color film substrate 10 and the TFT substrate 20. After a process cartridge into the liquid crystal display, a quantum dots display panel is obtained after a forming process of a liquid crystal box;

The quantum dots display panel includes the quantum dots color film substrate 10, and the TFT substrate 20 is disposed opposite to the quantum dots color film substrate 10. The liquid crystal layer 30 is sealed between the quantum dots color film substrate 10 and the TFT substrate 20. The upper polarizer 41 is arranged on one side of the quantum dots color film substrate 10, and the lower polarizer 42 is arranged on one side of the TFT substrate 20.

Specifically, in the quantum dots display panel of the step 4, the upper polarizer 41 is internal and is arranged on one side of the quantum dots color film substrate 10 toward the TFT substrate 20 The upper polarizer is dye type polaroid. In the quantum dots display panel of the step 4, the lower polarizer 42 is internal or external, the lower polarizer is arranged on one side of TFT substrate 20 toward or backward the quantum dots color substrate 10. The polarization direction of the lower polarizer 42 is perpendicular to the polarization direction of the upper polarizer 41.

Figure 3A:
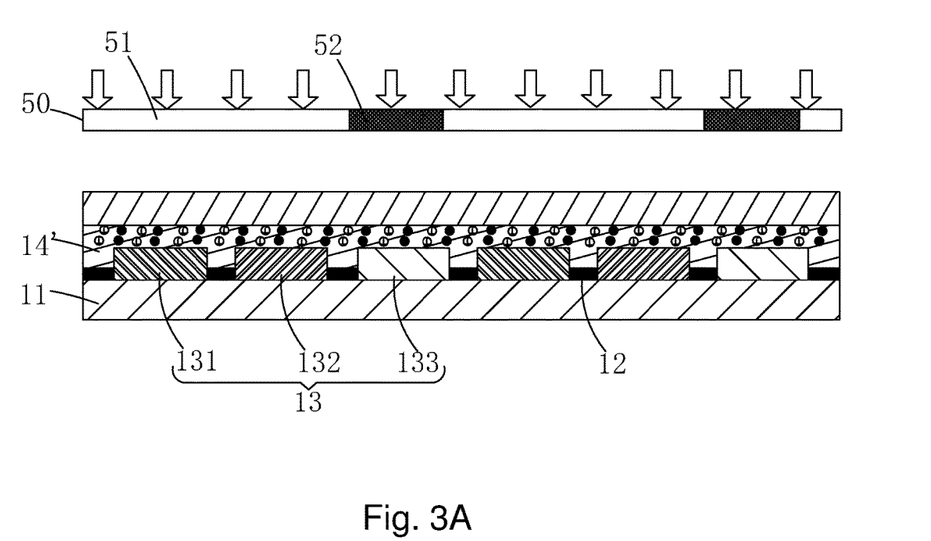
FIG. 3A is a schematic diagram of using light mask to expose the transparent photoresist material in step 3 of first embodiment according to the present disclosure.
Figure 3B:
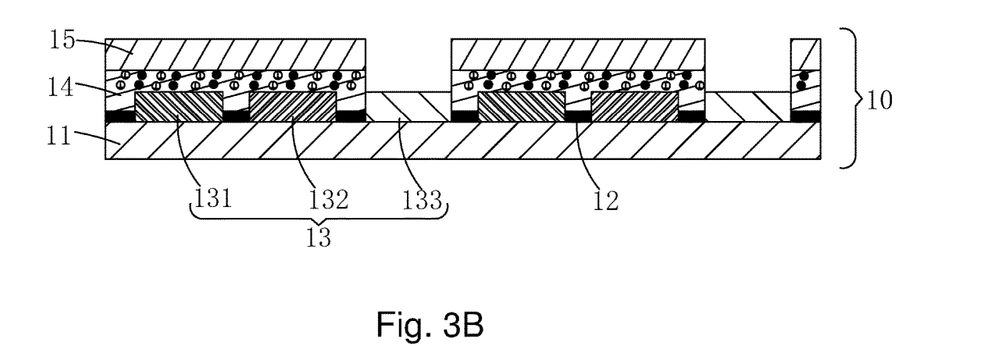
FIG. 3B is a schematic diagram of developing the transparent photoresist material in step 3 of first embodiment according to the present disclosure.

Specifically, shown in FIG. 5, in the quantum dots display panel of the step 4 the backlight used in the display device is blue. Backlight module 2 emits blue backlight. While the blue backlight is exciting, the quantum dots layer 14 mixing with the red and green quantum dots is emitting the red and green mixed light with the narrow FWHM. The mixed light is then passed through the red colored barrier layer 131, the green colored barrier layer 132, then is filtered into the high-purity red monochromatic light and the green monochromatic light to display red and green. The transparent light resistance layer 133, which is not covered by the quantum dots layer, displays blue directly from the blue backlight. Finally the desired red, green, and blue color by the color display is provided, and the display color gamut index is effectively improved. The quantum dots layer 14 does not include blue quantum dots material, but it uses the blue backlight matched with the transparent light resistance layer. Under the advantage of enhancing the light utilization, the cost of material is saved. In the first embodiment of the method for manufacturing quantum dots display panel according to the present disclosure, the step 3 of using the yellow light manufacturing process to perform patterning processing on the quantum dots film 14', the step 3 specifically includes the steps of:

Step 31, using a spin coating method or a slit coating method to coat a layer of transparent photoresist material (such as W photoresist, PFA photoresist) uniformly on the quantum dots film 14' after pre-baking;

Step 32, shown in FIG. 3A-3B, providing a light mask 50, and using the light mask 50 to perform development process and exposure process of the transparent photoresist material, wherein the light mask 50 includes a transmitting portion 51 corresponding to the red colored barrier layer 131 and the green colored barrier layer 132, a non-transmitting portion 52 corresponding to the transparent light resistance layer 133; wherein in the exposure process, the transparent photoresist material below the transmitting portions 51 takes polymerization reaction to solidify under illumination, the transparent photoresist material below the non-transmitting portions 52 does not take polymerization reaction to solidify, and in the development process, the solidified transparent photoresist material and the corresponding quantum dots film 14' below the solidified transparent photoresist material is not removed by developer, but the unsolidified transparent photoresist material and the corresponding quantum dots film 14' below the unsolidified transparent photoresist material are removed by developer; and obtaining a patterned quantum dots layer 14 and a photoresist layer 15 upon the pattern layer;

Specifically, since the photoinitiator in the transparent photoresist material promotes monomers to have polymerization under UV illumination and then the transparent photoresist material is solidified.

Step 33, baking the color film substrate at a temperature of 150-250 DEG C. to fully cure the quantum dots layer 14.

Figure 4A:
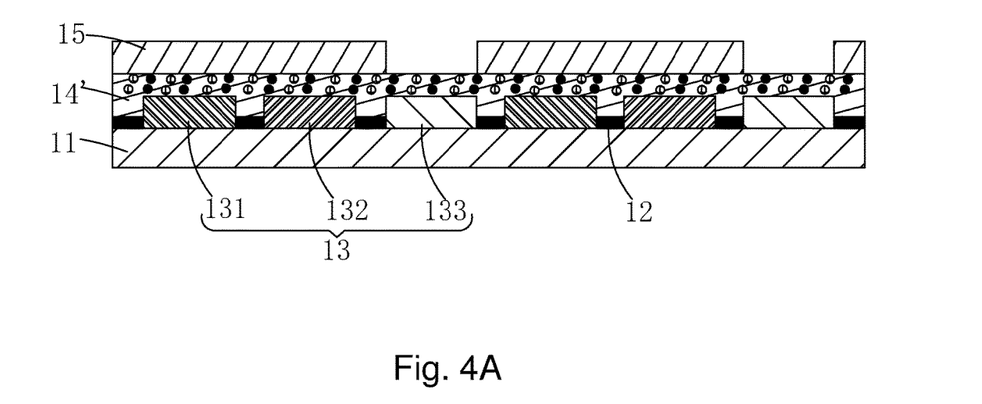
FIG. 4A is a schematic diagram of obtaining a patterned photoresist layer in step 3 of second embodiment according to the present disclosure.
Figure 4B:
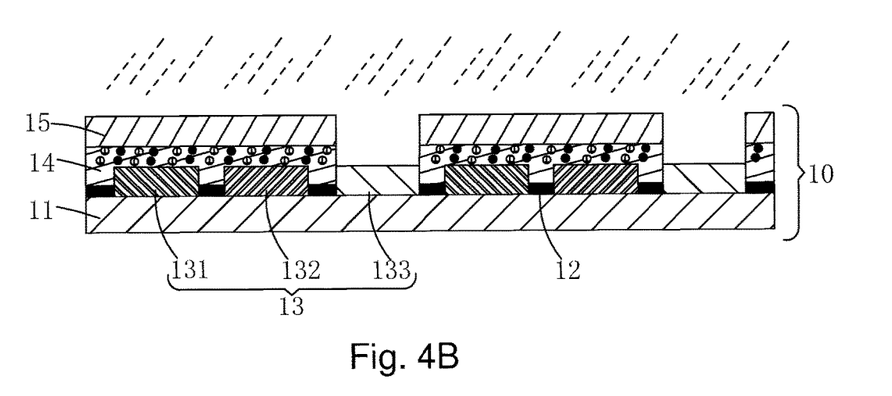
FIG. 4B is a schematic diagram of using photoresist layer as screening layer to dry etching the quantum dots film in step 3 of second embodiment according to the present disclosure.

In the second embodiment of the method for manufacturing quantum dots display panel according to the present disclosure, the step 3 of combining the yellow light manufacturing process with the dry etching manufacturing process to perform patterning processing on the quantum dots film 14', the step 3 specifically including the steps of:

Step 31', after pre-baking in step 2, baking the color film substrate at a temperature of 200-250 DEG C. to fully cure the quantum dots film 14';

Step 32', using a spin coating method or a slit coating method to coat a layer of transparent photoresist material (such as W photoresist, PFA photoresist) uniformly on the quantum dots film 14' after pre-baking; providing a light mask 50, and using the light mask 50 to perform development process and exposure process of the transparent photoresist material to obtain a patterned photoresist layer 15; wherein the light mask 50 includes a transmitting portion 51 corresponding to the red colored barrier layer 131 and the green colored barrier layer 132, a non-transmitting portion 52 corresponding to the transparent light resistance layer 133;

Step 33', shown in FIG. 4B, using the photoresist layer 15 as a screening layer, the color film substrate is processed by using a dry etching process, in process of the dry etching process, portion of the quantum dots film 14' on the red colored barrier layer 131 and the green colored barrier layer 132 is covered by the photoresist layer 15 but is not etched by the dry etching process, but portion of the quantum dots film 14' on the transparent light resistance layer 133 is not covered by the photoresist layer 15 but etched by the dry etching process to obtain a patterned quantum dots layer 14.

In summary, the present disclosure provides a method for manufacturing quantum dots display panel, which uses an existing yellow light manufacturing process from color filter or combines with a dry etching manufacturing process to resin composition with the surface-modified red quantum dots and the surface-modified green quantum dots, and then completing production of a quantum dots layer with a more refined graphical structure. Compared with other existing method for manufacturing quantum dots display panel, the present disclosure has the following advantages that simple preparation of raw materials and in making process, high-resolution graphics, large-scale volume production, and less processing time and less cost. The quantum dots are used into the structure of the color filter to effectively improve color saturation and gamut of the display device, and to enhance color performance of display panel.

Described above, those of ordinary skill in the art that may be made various other changes and modifications in accordance with the appropriate technical solutions and the technical concept of the disclosure, and all such changes and modifications within the scope of the disclosure should be protected.

What is claimed is:

1. A method for manufacturing quantum dots display panel comprises the following steps:

Step 1, obtaining a quantum dots resin composition by mixing surface-modified red quantum dots, surface-modified green quantum dots, alkali-soluble resin, solvent, and dispersant uniformly;

Step 2, providing a color film substrate, and the color film substrate comprising a substrate, a black array located on the substrate and a color filter layer, the color filter layer comprising a red colored barrier layer, a green colored barrier layer and a transparent light resistance layer;

Coating the quantum dots resin composition uniformly on color filter layer side of the color substrate by spin coating method or slit coating method, then pre-baking the substrate having the quantum dots resin composition at a temperature of 100-150 DEG C. to remove organic solvent and obtaining a quantum dots film;

Step 3, using a yellow light manufacturing process or combining with a dry etching manufacturing process to perform patterning processing on the quantum dots film, and removing part of the quantum dots film corresponding to the transparent light resistance layer to obtain a quantum dots layer, and then completing production of a quantum dots color film substrate;

Step 4, providing a TFT substrate, and respectively arranging an upper polarizer and a lower polarizer on the quantum dots color film substrate and the TFT substrate, and after a process cartridge into the liquid crystal display, obtaining a quantum dots display panel after a forming process of a liquid crystal box;

The quantum dots display panel comprises the quantum dots color film substrate, the TFT substrate disposed opposite to the quantum dots color film substrate, the liquid crystal layer sealed between the quantum dots color film substrate and the TFT substrate, the upper polarizer arranging on one side of the quantum dots color film substrate, the lower polarizer arranging on one side of the TFT substrate.

2. The method for manufacturing quantum dots display panel according to claim 1, wherein the step 3 of using the yellow light manufacturing process to perform patterning processing on the quantum dots film, the step 3 specifically comprising the steps of:

Step 31, using a spin coating method or a slit coating method to coat a layer of transparent photoresist material uniformly on the quantum dots film after pre-baking;

Step 32, providing a light mask, and using the light mask to perform development process and exposure process of the transparent photoresist material, wherein the light mask comprises a transmitting portion corresponding to the red colored barrier layer and the green colored barrier layer, a non-transmitting portion corresponding to the transparent light resistance layer; wherein in the exposure process, the transparent photoresist material below the transmitting portions takes polymerization reaction to solidify under illumination, the transparent photoresist material below the non-transmitting portions does not take polymerization reaction to solidify, and in the development process, the solidified transparent photoresist material and the corresponding quantum dots film below the solidified transparent photoresist material is not removed by developer, but the unsolidified transparent photoresist material and the corresponding quantum dots film below the unsolidified transparent photoresist material are removed by developer; and obtaining a patterned quantum dots layer and a photoresist layer upon the pattern layer;

Step 33, baking the color film substrate at a temperature of 150-250 DEG C. to fully cure the quantum dots layer.

3. The method for manufacturing quantum dots display panel according to claim 1, wherein the step 3 of combining the yellow light manufacturing with the dry etching manufacturing process to perform patterning processing on the quantum dots film, the step 3 specifically comprising the steps of:

Step 31', after pre-baking in step 2, baking the color film substrate at a temperature of 200-250 DEG C. to fully cure the quantum dots film;

Step 32', using a spin coating method or a slit coating method to coat a layer of transparent photoresist material uniformly on the quantum dots film after pre-baking; providing a light mask, and using the light mask to perform development process and exposure process of the transparent photoresist material to obtain a patterned photoresist layer, wherein the light mask comprises a transmitting portion corresponding to the red colored barrier layer and the green colored barrier layer, a non-transmitting portion corresponding to the transparent light resistance layer;

Step 33', using the photoresist layer as a screening layer, the color film substrate is processed by using a dry etching process, in process of the dry etching process, portion of the quantum dots film on the red colored barrier layer and the green colored barrier layer is covered by the photoresist layer but is not etched by the dry etching process, but portion of the quantum dots film on the transparent light resistance layer is not covered by the photoresist layer but etched by the dry etching process to obtain a patterned quantum dots layer.

4. The method for manufacturing quantum dots display panel according to claim 1, wherein in the step 1, the red quantum dots and the green quantum dots of the quantum dots resin composition are group II-VI semiconductor material, group III-V semiconductor material and one or more of group IV-VI nanometer semi-conductor material in one or more, and size of the red quantum dots size and the green quantum dots is 1-10 nm.

5. The method for manufacturing quantum dots display panel according to claim 1, wherein the step 1 the alkali-soluble resin is composed of styrene and maleic anhydride copolymer or styrene and aromatic acid (meth) acrylate half ester.

6. The method for manufacturing quantum dots display panel according to claim 1, wherein in the step 1 the solvent is composed of formic acid, acetic acid, chloroform, acetone, methyl ethyl ketone, alcohols, ethylene glycol monomethyl ether, ethylene glycol monoethyl ether, ethylene glycol monomethyl ether, ethylene glycol monomethyl ether, diethylene glycol diethyl ether ethyl acetate, methyl ethyl ketone, methyl isobutyl ketone, ethylene glycol monomethyl ether acetate, γ-butyrolactone, prop-3-acid ether acetate, butyl carbitol, butyl carbitol, acetate, propylene glycol monomethyl ether, propylene glycol monomethyl ether acetate, cyclohexane, xylene and isopropanol in one or more components.

7. The method for manufacturing quantum dots display panel according to claim 1, wherein in the step 2, thickness of the quantum dots resin composition coated on the color film substrate is 1 μm-200 μm.

8. The method for manufacturing quantum dots display panel according to claim 1, wherein in the quantum dots display panel of the step 4, the upper polarizer is internal and is arranged one side of the quantum dots color film substrate toward the TFT substrate; the upper polarizer is dye type polaroid.

9. The method for manufacturing quantum dots display panel according to claim 1, wherein in the quantum dots display panel of the step 4, the lower polarizer is internal or external, the lower polarizer is arranged one side of TFT substrate toward or backward the quantum dots color substrate; polarization direction of the lower polarizer is perpendicular to polarization direction of the upper polarizer.

10. The method for manufacturing quantum dots display panel according to claim 1, wherein the quantum dots display panel of the step 4 is used in a blue backlight display device.

11. A method for manufacturing quantum dots display panel comprises the following steps:

Step 1, obtaining a quantum dots resin composition by mixing surface-modified red quantum dots, surface-modified green quantum dots, alkali-soluble resin, solvent, and dispersant uniformly;

Step 2, providing a color film substrate, and the color film substrate comprising a substrate, a black array located on the substrate and a color filter layer, the color filter layer comprising a red colored barrier layer, a green colored barrier layer and a transparent light resistance layer;

Coating the quantum dots resin composition uniformly on color filter layer side of the color substrate by spin coating method or slit coating method, then pre-baking the substrate having the quantum dots resin composition at a temperature of 100-150 DEG C. to remove organic solvent and obtaining a quantum dots film;

Step 3, using a yellow light manufacturing process or combining with a dry etching manufacturing process to perform patterning processing on the quantum dots film, and removing part of the quantum dots film corresponding to the transparent light resistance layer to obtain a quantum dots layer, and then completing production of a quantum dots color film substrate;

Step 4, providing a TFT substrate, and respectively arranging an upper polarizer and a lower polarizer on the quantum dots color film substrate and the TFT substrate, and after a process cartridge into the liquid crystal display, obtaining a quantum dots display panel after a forming process of a liquid crystal box;

The quantum dots display panel comprises the quantum dots color film substrate, the TFT substrate disposed opposite to the quantum dots color film substrate, the liquid crystal layer sealed between the quantum dots color film substrate and the TFT substrate, the upper polarizer arranging on one side of the quantum dots color film substrate, the lower polarizer arranging on one side of the TFT substrate;

Wherein in the step 1, the red quantum dots and the green quantum dots of the quantum dots resin composition are group II-VI semiconductor material, group III-V semiconductor material and one or more of group IV-VI nanometer semi-conductor material in one or more, and size of the red quantum dots size and the green quantum dots is 1-10 nm.

Wherein the step 1 the alkali-soluble resin is composed of styrene and maleic anhydride copolymer or styrene and aromatic acid (meth) acrylate half ester;

Wherein in the step 1 the solvent is composed of formic acid, acetic acid, chloroform, acetone, methyl ethyl ketone, alcohols, ethylene glycol monomethyl ether, ethylene glycol monoethyl ether, ethylene glycol monomethyl ether, ethylene glycol monomethyl ether, diethylene glycol diethyl ether ethyl acetate, methyl ethyl ketone, methyl isobutyl ketone, ethylene glycol monomethyl ether acetate, γ-butyrolactone, prop-3-acid ether acetate, butyl carbitol, butyl carbitol, acetate, propylene glycol monomethyl ether, propylene glycol monomethyl ether acetate, cyclohexane, xylene and isopropanol in one or more components.

12. The method for manufacturing quantum dots display panel according to claim 11, wherein the step 3 of using the yellow light manufacturing process to perform patterning processing on the quantum dots film, the step 3 specifically comprising the steps of:

Step 31, using a spin coating method or a slit coating method to coat a layer of transparent photoresist material uniformly on the quantum dots film after pre-baking;

Step 32, providing a light mask, and using the light mask to perform development process and exposure process of the transparent photoresist material, wherein the light mask comprises a transmitting portion corresponding to the red colored barrier layer and the green colored barrier layer, a non-transmitting portion corresponding to the transparent light resistance layer; wherein in the exposure process, the transparent photoresist material below the transmitting portions takes polymerization reaction to solidify under illumination, the transparent photoresist material below the non-transmitting portions does not take polymerization reaction to solidify, and in the development process, the solidified transparent photoresist material and the corresponding quantum dots film below the solidified transparent photoresist material is not removed by developer, but the unsolidified transparent photoresist material and the corresponding quantum dots film below the unsolidified transparent photoresist material are removed by developer; and obtaining a patterned quantum dots layer and a photoresist layer upon the pattern layer;

Step 33, baking the color film substrate at a temperature of 150-250 DEG C. to fully cure the quantum dots layer.

13. The method for manufacturing quantum dots display panel according to claim 11, wherein in the step 3 of combining the yellow light manufacturing with the dry etching manufacturing process to perform patterning processing on the quantum dots film, the step 3 specifically comprising the steps of:

Step 31', after pre-baking in step 2, baking the color film substrate at a temperature of 200-250 DEG C. to fully cure the quantum dots film;

Step 32', using a spin coating method or a slit coating method to coat a layer of transparent photoresist material uniformly on the quantum dots film after pre-baking; providing a light mask, and using the light mask to perform development process and exposure process of the transparent photoresist material to obtain a patterned photoresist layer, wherein the light mask comprises a transmitting portion corresponding to the red colored barrier layer and the green colored barrier layer, a non-transmitting portion corresponding to the transparent light resistance layer;

Step 33', using the photoresist layer as a screening layer, the color film substrate is processed by using a dry etching process, in process of the dry etching process, portion of the quantum dots film on the red colored barrier layer and the green colored barrier layer is covered by the photoresist layer but is not etched by the dry etching process, but portion of the quantum dots film on the transparent light resistance layer is not covered by the photoresist layer but etched by the dry etching process to obtain a patterned quantum dots layer.

14. The method for manufacturing quantum dots display panel according to claim 11, wherein in the step 2 thickness of the quantum dots resin composition coated on the color film substrate is 1 μm-200 μm.

15. The method for manufacturing quantum dots display panel according to claim 11, wherein in the quantum dots display panel of the step 4, the upper polarizer is internal and is arranged one side of the quantum dots color film substrate toward the TFT substrate; the upper polarizer is dye type polaroid.

16. The method for manufacturing quantum dots display panel according to claim 11, wherein in the quantum dots display panel of the step 4, the lower polarizer is internal or external, the lower polarizer is arranged one side of TFT substrate toward or backward the quantum dots color substrate; polarization direction of the lower polarizer is perpendicular to polarization direction of the upper polarizer.

17. The method for manufacturing quantum dots display panel according to claim 11, wherein the quantum dots display panel of the step 4 is use for a blue backlight display device.

* * * * *